United States Patent [19]

Arakawa et al.

[11] Patent Number: 5,297,051
[45] Date of Patent: Mar. 22, 1994

[54] MAP DISPLAY DEVICE

[75] Inventors: Takeharu Arakawa; Morio Araki; Kiyoshi Yamanaka, all of Kawagoe, Japan

[73] Assignee: Pioneer Electronic Corporation, Tokyo, Japan

[21] Appl. No.: 848,921

[22] Filed: Mar. 10, 1992

[30] Foreign Application Priority Data

Mar. 18, 1991 [JP] Japan ................................. 3-52542

[51] Int. Cl.⁵ ........................................... G06F 15/50
[52] U.S. Cl. ................... 364/449; 364/443; 340/990; 340/995
[58] Field of Search ............... 364/443, 444, 449; 73/178 R; 340/988, 990, 995

[56] References Cited

U.S. PATENT DOCUMENTS

| | | | |
|---|---|---|---|
| 4,527,155 | 7/1985 | Yamaki et al. | 340/990 |
| 4,608,656 | 8/1986 | Tanaka et al. | 340/988 |
| 4,628,456 | 12/1986 | Hatano et al. | 340/995 |
| 4,812,980 | 3/1989 | Yamada et al. | 364/449 |

FOREIGN PATENT DOCUMENTS

| | | |
|---|---|---|
| 0059435 | 9/1982 | European Pat. Off. . |
| 0355232 | 2/1990 | European Pat. Off. . |
| 63-12096 | 1/1988 | Japan . |
| 8602764 | 5/1986 | PCT Int'l Appl. . |

Primary Examiner—Gary Chin
Attorney, Agent, or Firm—Sughrue, Mion, Zinn, Macpeak & Seas

[57] ABSTRACT

An on-board navigation apparatus constantly displays characters of name data associated with geographical data in legible order and direction whenever the display direction is changed to one of the north, south, east, and west directions. In operation, after the geographical data and associated name data in a desired region are read, name reference point and name area of the read name data is retrieved, and display direction of map orientation is retrieved. Coordinates of a drawing start point are then calculated on the basis of absolute coordinate of name reference point in accordance with the display direction. Correspondence between absolute coordinates of the geographical data and the coordinates of the drawing start point of the name data is established, and the name data is written into the name area so that the geographical data and the name data are stored while being superimposed with each other, thereby forming map data. The display is performed on the basis of the map data produced by the superimposition.

6 Claims, 6 Drawing Sheets

MAP DISPLAY DEVICE

BACKGROUND OF THE INVENTION

1. Field of the Invention

The present invention relates to an on-board navigation apparatus and more particularly, an on-board navigation apparatus designed to display, at a display device (referred to as a display hereinafter), pictures including map information on the basis of the position of the vehicle itself

2. Description of Background Information

On-board navigation apparatuses have been introduced for practical use, in which map information is previously stored in memory, and retrieved from memory for display into a display device together with a current position of the vehicle, so that the vehicle is navigated to a predetermined destination.

The display of map information by such on-board navigation apparatuses is generally performed as follows Map information to be displayed is previously stored in a storage medium, e.g. a CD-ROM, and particular map information is read-out and loaded into a buffer memory prior to being transferred to the display device Map data is retrieved from the CD-ROM according to the type of data, and is formed by loading into the buffer memory geographical data representing the shape of roads, rivers, mountains, buildings, and so on, and name data for indicating the name of corresponding items The geographical data and name data are superimposed with each other so that the map data is drawn in the buffer memory. Otherwise, the name data may be included as a part of the map data of a single type prepared in the CD-ROM, so that the name data can by displayed by using such map data.

Figure 2:
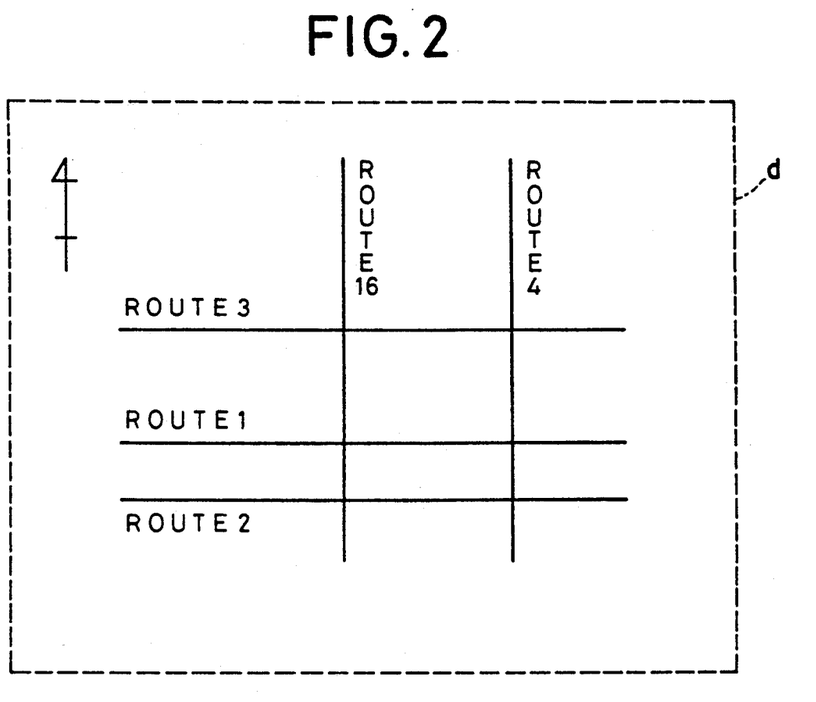
FIG. 2 is an explanatory view showing a manner of display in a prior art arrangement.

FIG. 2 shows an example of a display of roads as geographical data and corresponding names as name data on the display. The north direction of the map is normally displayed on the display. More particularly, the manner of display in this case is that the upward direction of the display screen d corresponds to the north direction on the map. Each road shown by a bold line is accompanied with its name, e.g. route 1 (when the road name is expressed in Japanese language, Kanji characters of, e.g. 国道1号 meaning "national highway route 1", may be used). These letters or characters representing the road name are arranged either downward from top to bottom in the case of vertical writing, or horizontally from left to right in the case of horizontal writing.

Figure 3:
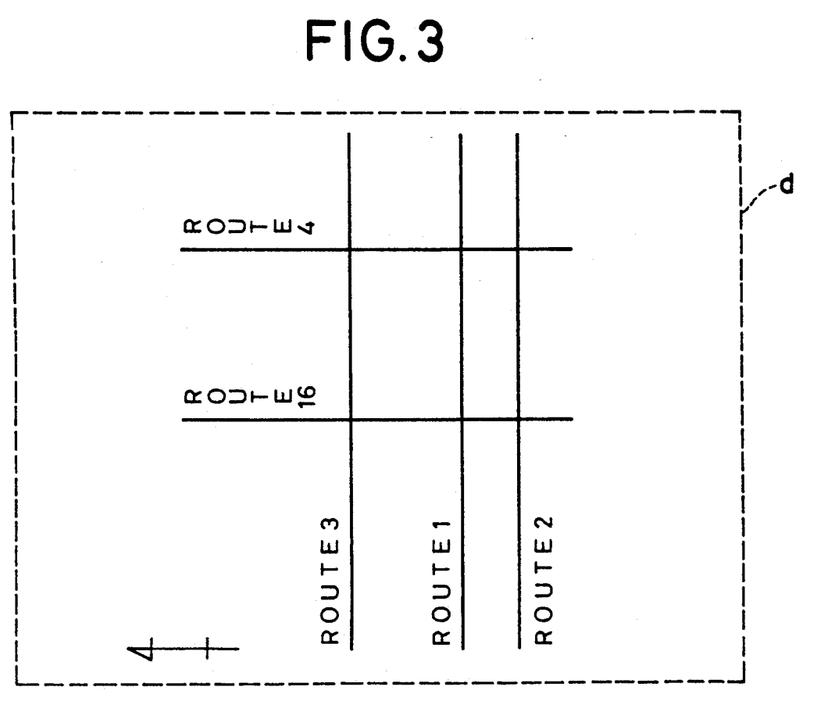
FIG. 3 is an explanatory view showing a manner of display in the prior art arrangement.

However, if the map data shown in FIG. 2 is rotated so that the upward direction of the display screen corresponds to the east direction, the road names assigned to each road also become rotated correspondingly as shown in FIG. 3. As the result, difficulty in reading will be experienced by a viewer who is monitoring name information in the map information, as there can be cases where the characters should be read in an inverse order, or each letter or character should be rotated by 90°, for example, to form proper image of the road name. In particular, it is especially difficult for a driver to recognize such characters not arranged in proper order or orientation in the display screen.

SUMMARY OF THE INVENTION

The present invention has been made in view of the drawback described in the foregoing, and an object of the present invention is to provide an improved on-board navigation apparatus which constantly displays each name data in legible order and arrangement, when displaying map information, even if the display direction is changed to any of the north, south, east, and west, directions.

A map display device according to the present invention comprises: a storage medium for storing geographical data and associated name data in a map; reading means for reading the geographical data and said name data of a desired region of the map from the storage medium; retrieving means for retrieving a name reference point and a name area of the name data read by the reading means; retrieving means for retrieving a display direction of map orientation, calculating means for calculating coordinates of a drawing start point of the name data on the basis of absolute coordinate of the name reference point according to the display direction; superimposing means for establishing correspondence between absolute coordinates of the geographical data and the coordinates of the drawing start point of the name data and writing the name data into the name area so that the geographical data and the name data are stored while being superimposed with each other, thereby forming map data; and display controlling means for displaying the map data.

In operation, a variety of data are superimposed to draw the map data in a buffer memory. At this time the drawing start point of each name data is calculated by using coordinate data of the name data with reference to the display direction of the north, south, east and west directions as well as the number of characters, and the geographical data and the name data are superimposed by using the calculated drawing start point.

DETAILED DESCRIPTION OF A PREFERRED EMBODIMENT

Figure 1:
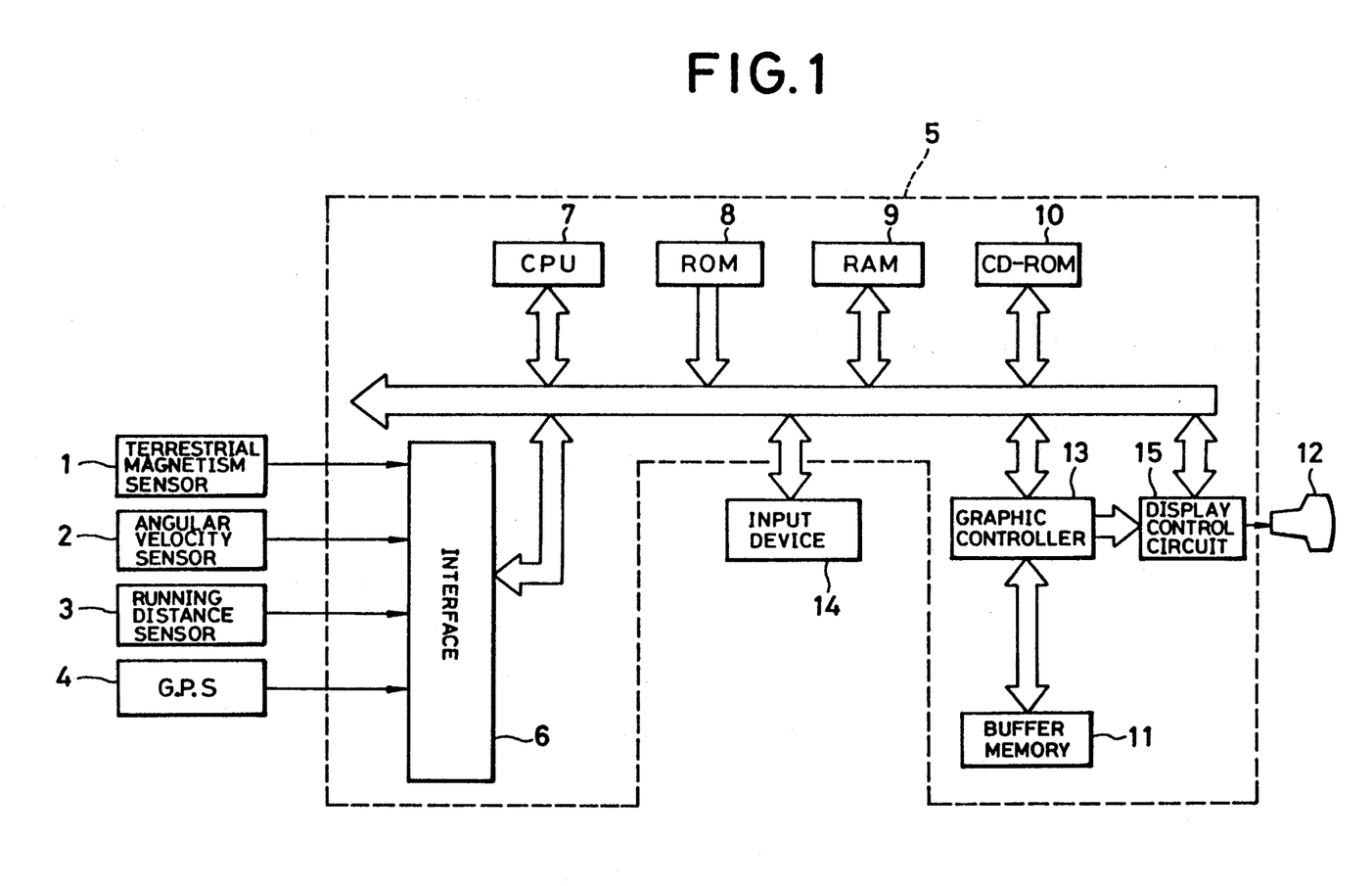
FIG. 1 is a block diagram of an on-board navigation apparatus showing one preferred embodiment of the present invention.

FIG. 1 is a block diagram of an on-board navigation apparatus in which the display device according to the present invention is suitably adopted. The embodiment will be described specifically with reference to this drawing.

In the figure, illustrated are a terrestrial magnetism sensor 1 for producing azimuth data of the vehicle by the detection of terrestrial magnetism (earth's magnetic field), an angular velocity sensor 2 for detecting an angular velocity of the vehicle, a running distance sensor 3 for measuring the distance traveled by the vehicle, a GPS (global positioning system) 4 for detecting the current position of the vehicle from latitude and longitude information and so on, and a system controller 5 to which outputs of the sensors (and system) 1 to 4 are supplied The system controller 5 comprises an interface 6 for receiving the outputs of the sensors (and system) 1 to 4 and performing, for example, an A/D conversion of the received signals, a CPU (central processing unit) 7 for performing various image processing operations and calculating e.g. the amount of movement of the vehicle from the output data of the sensors 1 to 4 successively supplied through the interface 6, a ROM (read only memory) 8 for storage of various processing programs for the CPU 7 and of other necessary data, a RAM (random access memory) 9 into and from which information needed for the execution of a program is written and read out, a recording medium 10, e.g. a CD-ROM or an IC card, which carries digitized map data, a buffer memory 11 for temporarily storing image data ready for the display, operating as a frame buffer and comprising e.g. a video RAM, a graphic controller 13 for writing the data, e.g. geographical information, supplied in response to command of the CPU 7, into the buffer memory 11 and outputting the data as image information, and a display controlling circuit 15 for controlling a display 12, e.g. a liquid crystal display device or a CRT, in response to the image data supplied from the graphic controller 13. Also, an input device 14, e.g. a keyboard, is provided for transmitting a variety of commands to the system controller 5 in response to key entry by an operator.

The geographical data and associated name data together forming map data are respectively stored in the CD-ROM 10 or the buffer memory 11. Each data is in the form of pixel data prepared for absolute coordinates (X, Y) on the map of, for example, longitude and latitude information.

In the embodiment described below, it is assumed that the geographical data and name data are superimposed and drawn in the buffer memory 11 in terms of the absolute coordinates mentioned above, and the arrangement of these data relative to each other is determined.

Figure 5:
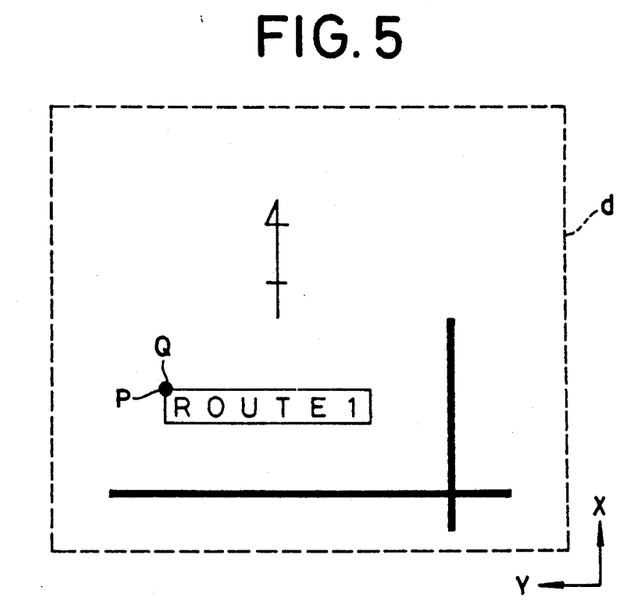
FIGS. 5, 6, 7, and 8 are explanatory views associated with the procedure shown in FIG. 4.

In FIG. 5, absolute coordinates are formed with the south to north direction of the map orientation being registered on a positive direction of the X-axis and the east to west direction being registered on a positive direction of the Y-axis. Each name data is formed by groups of pixel data, each group forming a character, for example, in a square area of 16×16 dots. More specifically, the name data is retrieved from the ROM 8 for each character of the name data by using a so-called character code group, such as Kanji code group, each code of which designates a particular pattern of the pixel data. Furthermore, in order to arrange the pixel data on the plane of absolute coordinates, each name data has a pair of absolute coordinate data for a reference pixel data (point P) at the head of a data string of the first character of the name data. The point P will be referred to as name reference point hereinafter. Hence, each name data contains absolute coordinate data assigned at its name reference point. Also, the name data includes data representing a drawing area particular to each name data on the basis of the name reference point. The area will be designated as name area which is defined, for example, as an interior of the rectangle surrounding the characters of "ROUTE1" in FIG. 5.

In operation of the map display device of the present invention, the coordinate data of a drawing start point Q for the characters of a name is calculated from the absolute coordinates of the name reference point P according to the display direction of the map. The drawing start point Q is then used as a new reference point for arranging the name data relative to the geographical data.

Figure 4:
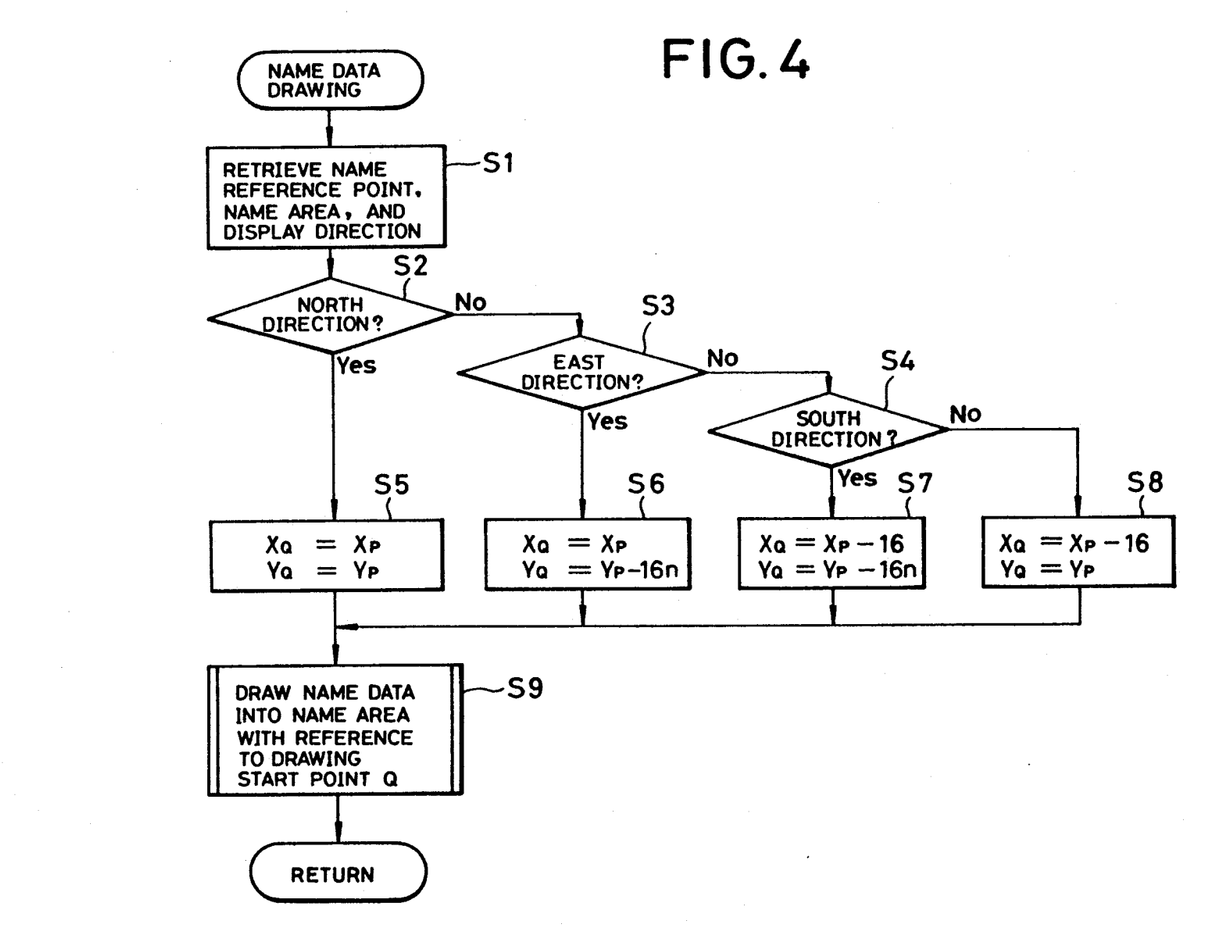
FIG. 4 is a flow chart showing processing procedure executed according to the present invention.

The procedure of drawing the name data into the buffer memory 11 performed by the CPU 7 and graphic controller 13 in cooperation with the buffer memory 11 will be described with reference to the flowchart of FIG. 4.

This procedure is provided as a subroutine of a main routine performing a variety of procedure such as the calculation of current position of the vehicle, retrieval of map data, etc. Since this main routine is similar to the one disclosed in Japanese Patent Application Laid-Open No. 63-12096, the detailed explanation thereof will not be made.

The procedure starts with the operation of the CPU 7 to retrieve the name reference point P and the name area of the name data to be displayed and the display direction of the map image (Step S1).

It is then determined how the name data is to be superimposed on the geographical data drawn in the buffer memory 11 according to the retrieved display direction of the map orientation (Steps S2, S3, and S4).

If the retrieved display direction of the map orientation is that the upward direction of the display image is set to the north direction, or more specifically, the positive direction of the absolute coordinate axis X, absolute coordinates (XP, YP) of the name reference point P are directly used as coordinates of the drawing start point Q (XQ, YQ). This relation is expressed by:

$$XQ=XP, \quad YQ=YP \tag{1}$$

If the retrieved display direction of the map orientation is that the upward direction of the display image is set to the east direction, or the negative direction of the absolute coordinate axis Y, coordinates of the drawing start point Q (XQ, YQ) are calculated from the absolute coordinates (XP, YP) of the name reference point P (at Step S6) following the equation of:

$$XQ=XP, \quad YQ=YP-16\times n \tag{2}$$

where n is the number of characters of the name data and the number 16 represents the number of dots in one character width.

Similarly, if the retrieved display direction of the map orientation is that the upward direction of the display image is set to the south direction, or the negative direction of the absolute coordinate axis X, coordinates of the drawing start point Q (XQ, YQ) are calculated from the absolute coordinates (XP, YP) of the name reference point P (at Step S7) following the equation of:

$$XQ=XP-16, \quad YQ=YP-16\times n \tag{3}$$

If the retrieved display direction of the map orientation is that the upward direction of the map image is set to the west direction, or the positive direction of the absolute coordinate axis Y, the coordinates of the drawing start point Q (XQ, YQ) is calculated (step S8) from the coordinates (XP, YP) of the name reference point Step S8 following the equation of:

$$XQ=XP-16, \quad YQ=YP \tag{4}$$

According to the coordinate data (XQ, YQ) of the drawing start point Q obtained through the steps described above, and of the name area retrieved at Step S1, name data is drawn into the buffer memory 11 at step S9 so that the name data is received within the name area. If the geographical data has already been drawn in the buffer memory 11 at this point of time, the name data is drawn to be superimposed on the geographical data, to compose the map data.

In the branch flow which passes Step S5, the drawing start point Q of the name data is identical to the name reference point P as the upward direction of the display image is set to the north direction.

Accordingly, the map data obtained by the superimposition is legibly displayed as shown in FIG. 5 if display control is performed so that the positive direction of the absolute coordinate axis X is directed upward in the display image.

Figure 6:
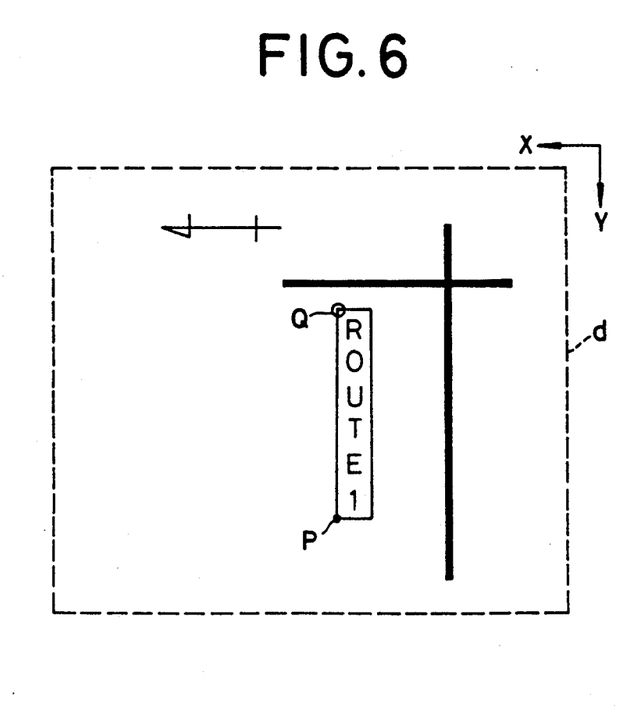

In the branch flow which passes Step S6, the drawing start point Q of the name data is displaced from the name reference point P by an amount corresponding to the number of characters composing the name in the negative direction of the absolute coordinate axis Y as the upward direction of the display image is set to the east direction. Accordingly, the map data obtained by the superimposition is legibly displayed as shown in FIG. 6 if the display control is performed so that the negative direction of the absolute coordinate axis Y is directed upward in the display image.

Figure 7:
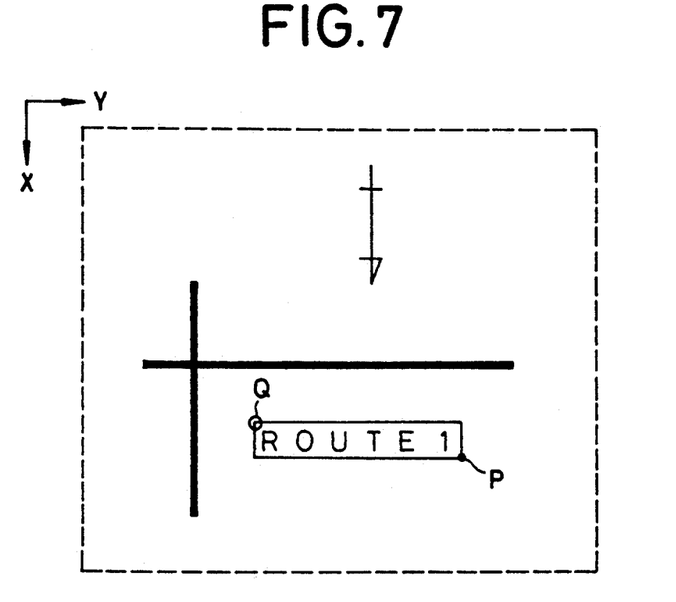

Similarly, in the branch flow which passes Step S7, the drawing start point Q of the name data is displaced from the name reference point P by an amount corresponding to the width of one character in the negative direction of the absolute coordinate axis X and an amount corresponding to the number of characters composing the name in the negative direction of the absolute coordinate axis Y as the south direction is set to the upward direction of the display image. Accordingly, the map data obtained by the superimposition is legibly displayed as shown in FIG. 7 if the display control is performed so that the negative direction of the absolute coordinate axis X is set to the upward direction of the display image.

Figure 8:
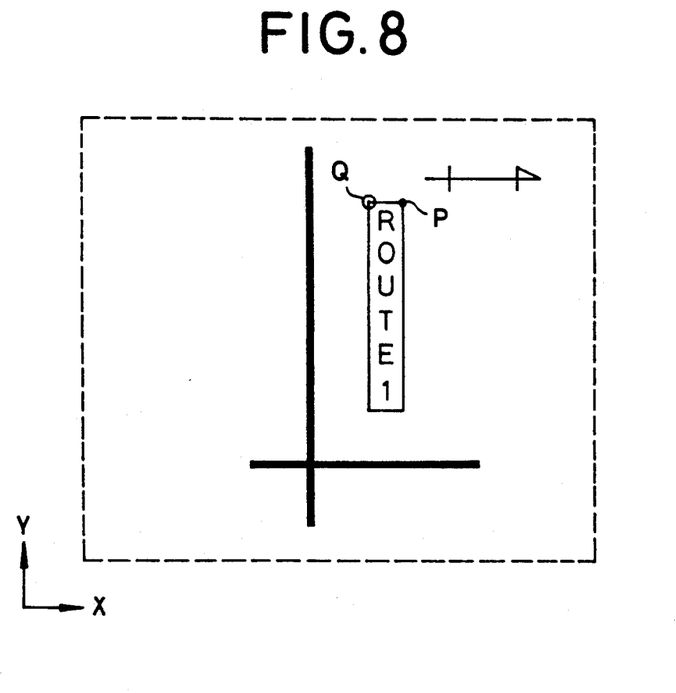

In the last branch flow which passes Step S8, the drawing start point Q of the name data is displaced from the name reference point P by the amount corresponding to the width of one character in the negative direction of the absolute coordinate axis X as the west direction is set to the upward direction of the display image. Accordingly, the map data obtained by the superimposition is legibly displayed as shown in FIG. 8 if the display control is performed so that the positive direction of the absolute coordinate axis Y is directed to the upward direction of the display image.

As described above, the positional relation between the drawing start point Q and the name reference point P is varied according the change in the display direction of the map orientation, so that the name data always is displayed in a fixed order and direction. The foregoing description is made for the case where characters composing the name data are aligned along the absolute coordinate axis Y as shown in FIG. 5. It would be apparent that when the characters of the name data are arranged along the absolute coordinate axis X, it is sufficient to alter the equations (1) to (4) for converting the coordinates of the name reference point to obtain the coordinates of the drawing start point Q at Steps S5 to S8, as follows:

$$XQ = XP, \quad YQ = YP \quad (1)$$

$$XQ = XP, \quad YQ = YP - 16 \quad (2)$$

$$XQ = XP - 16 \times n, \quad YQ = YP - 16 \quad (3)$$

$$XQ = XP - 16 \times n, \quad YQ = YP \quad (4)$$

Figure 9:
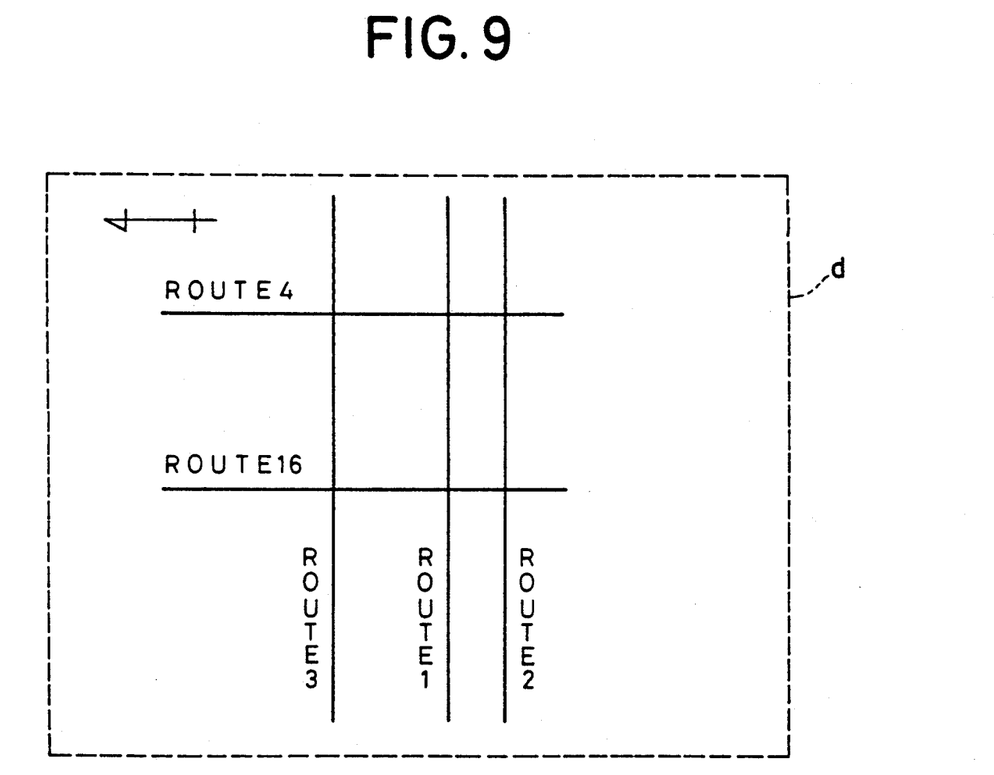
FIG. 9 is an explanatory view showing the effect of the present invention.

Accordingly, also when, for example, the display direction of the map orientation is such that the east direction is directed to the upward direction of the display image, the name data is displayed in legible order and direction to the user as shown in FIG. 9.

As described above, the present invention allows the calculation of coordinates of a drawing start point from absolute coordinates of the name reference point in the name data according to the display direction of the map orientation, and the superimposition of the name data on the geographical data on the basis of the drawing start point. More particularly, the name data can be displayed in legible order and direction in the screen of a map display device regardless of changes in the display direction of the map orientation, that is, the north, south, east and west direction. This permits a driver of the vehicle to read the name data on the map display with much ease and thus, the display device of the invention is advantageous for use with a car navigation apparatus in which a number of name data is superimposed on geographical data.

What is claimed is:

1. A map display device comprising:
   a storage medium for storing geographical data and associated name data;
   reading means for reading said geographical data and said name data of a predetermined regional part from said storage medium;
   retrieving means for retrieving a name reference point having absolute coordinates and a name area of said name data read by said reading means and for retrieving a display direction of map orientation;
   calculating means for calculating a display start point for said name data including name data display coordinates on the basis of said absolute coordinates of said name reference point and in accordance with said display direction of map orientation in a manner that said name data display coordinates are at a corner of said name area associated with said name reference point;
   superimposing means for correlating absolute coordinates of said geographical data with said name data display coordinates of said display start point of said name data, and writing said name data into said name area with reference to said display start point so that said geographical data and said name data are superimposed with each other, thereby forming map data; and
   display controlling means for displaying said map data on a display.

2. A map display device according to claim 1, wherein said calculating means calculates said name data display coordinates of said display start point with respect to each display direction so that the name data is written within said name area by said superimposing means.

3. A map display device according to claim 2, wherein when said display direction of map orientation is north, said name data display coordinates of said display start point for said name data equals said absolute coordinates.

4. A map display device according to claim 2, wherein, when said display direction of map orientation is east, an x-coordinate of said name data display coordinates of said display start point equals an x-coordinate of said absolute coordinates of said name reference point, and a y-coordinate point of said name data display coordinates of said display start point equals a y-coordinate of said absolute coordinates of said name reference point minus a predetermined number representing a character width times the number of characters in said name data.

5. A map display device according to claim 2, wherein, when said display direction of map orientation is south, an x-coordinate of said name data display coordinates of said display start point equals an x-coordinate of said absolute coordinates of said name reference point minus a predetermined number representing a character width, and a y-coordinate point of said name data display coordinates of said display start point equals a y-coordinates of said absolute coordinates of said name reference point minus said predetermined number times the number of characters in said name data.

6. A map display device according to claim 2, wherein, when said display direction of map orientation is west, an x-coordinate of said name data display coordinates of said display start point equals an x-coordinate of said absolute coordinates of said name reference point minus a predetermined number representing a character width, and a y-coordinate point of said name data display coordinates of said display start point equals a y-coordinates of said absolute coordinates of said name reference point.

* * * * *